United States Patent [19]

Enoksson

[11] 4,111,400
[45] Sep. 5, 1978

[54] ELECTRIFIED FENCE

[75] Inventor: Bertil Petrus Enoksson, Gyttorp, Sweden

[73] Assignee: Nitro Nobel AB, Gyttorp, Sweden

[21] Appl. No.: 780,000

[22] Filed: Mar. 22, 1977

Related U.S. Application Data

[63] Continuation-in-part of Ser. No. 680,790, Apr. 27, 1976, abandoned.

[30] Foreign Application Priority Data

Apr. 30, 1975 [SE] Sweden .............................. 7505043

[51] Int. Cl.$^2$ ............................................. A01K 3/00
[52] U.S. Cl. .................................................. 256/47
[58] Field of Search ........................... 256/10, 4, 1; 174/158 F, 110 R, 133 R, 129

[56] References Cited

U.S. PATENT DOCUMENTS

| | | | |
|---|---|---|---|
| 3,291,897 | 12/1966 | Bramley | 256/10 |
| 3,504,892 | 4/1970 | Crist | 256/10 |
| 3,980,277 | 9/1976 | Enoksson | 256/10 |

Primary Examiner—Doris L. Troutman
Attorney, Agent, or Firm—Hane, Roberts, Spiecens & Cohen

[57] ABSTRACT

An electrified fence for fencing-in livestock and fencing-out wild animals has as electric conductors pliable multi-layer ribbons including an outer and an inner metal layer. The two metal layers are separated by insulation layers made of plastics material. The inner metal layer is covered on its outwardly facing side by an insulation layer. The outwardly facing side of the outer metal layer is light reflective and the outside of the cover layer for the second metal layer is dark-colored. The ribbons are detachably secured to fence poles and are chargeable with a high voltage.

5 Claims, 15 Drawing Figures

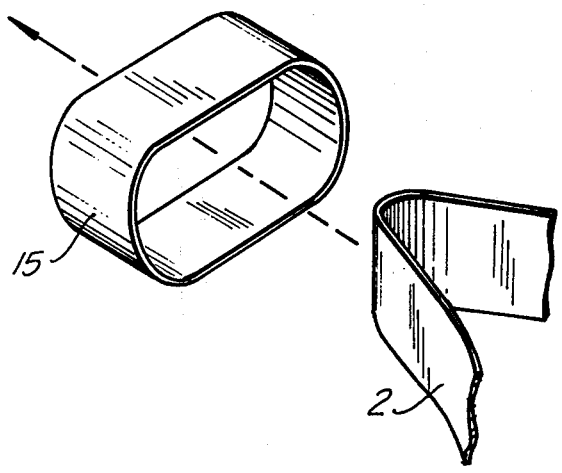
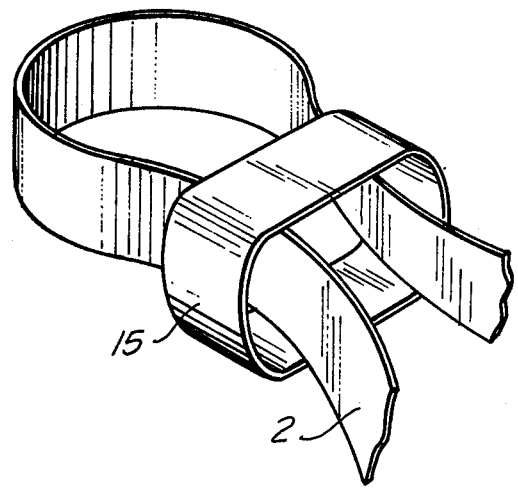
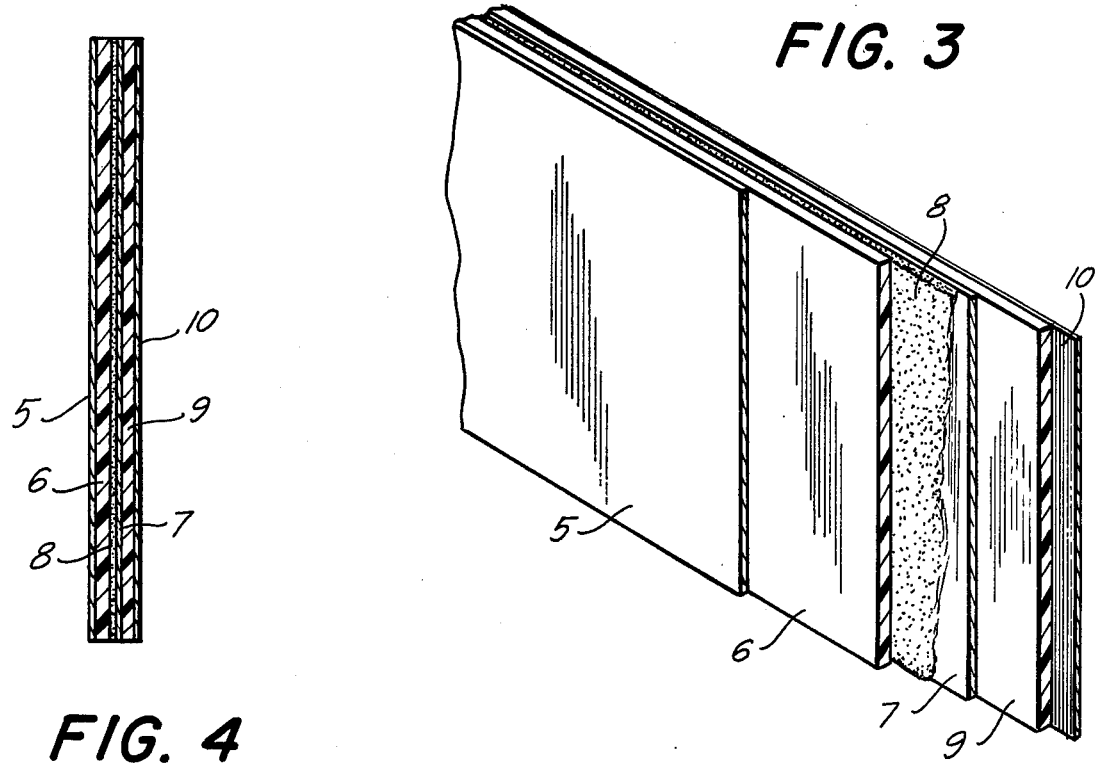

FIG. 12
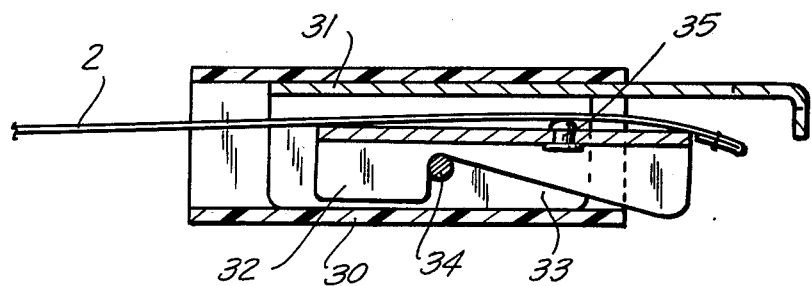
FIG. 13
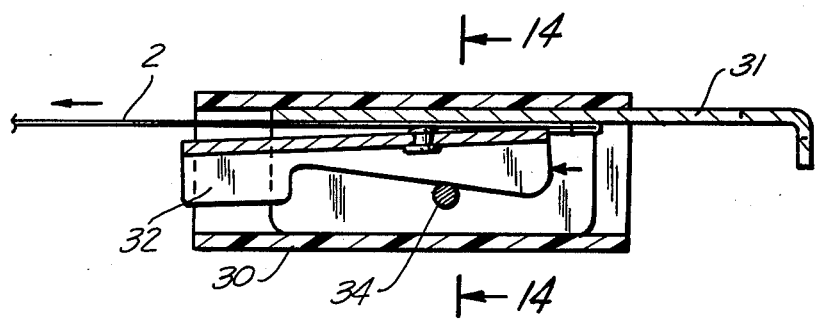
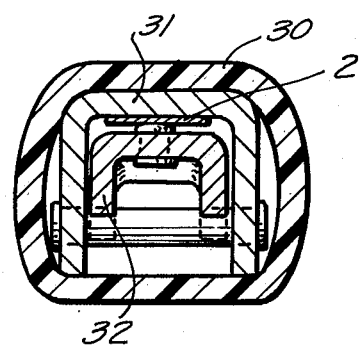
FIG. 14

ELECTRIFIED FENCE

This application is a continuation-in-part application of application Ser. No. 680,790, filed Apr. 27, 1976 now abandoned.

The present invention relates to an electrified fence, and more particularly to electrically conductive ribbons for such fence and fastening and clamping means for securing such ribbon to carriers such as poles.

BACCKGROUND

Electrified fences of the general type above referred to are widely used for deterring humans from trespassing on an enclosed area, to fence-in domesticated animals such as livestock, horses, etc., and to fence-out wild animals. For this purpose, one or more electrically conducting ribbons defining the area to be fenced-in or fenced-out are charged with high voltage pulses selected so that a human or animal touching a ribbon of the fence receives a shock which is a deterrant but does not harm the human or animal involved.

As fences of the type herein involved are generally used in the open, they are exposed to all weather conditions such as wind, rain, snow, heat and cold. To be practical, the fence must have a reasonably long useful life. This generally presents no diffuculty with respect to the poles or other carriers mounting the ribbons, but it does present a problem with respect to the ribbons. A ribbon is inherently more fragile than a pole which may be made of synthetic plastics material, metal or wood. Moreover, the ribbons are bound to be subjected to an impact by animals. To reduce such impacts by animals and humans, it is desirable that the ribbons are highly visible.

Another requirement for fences of the kind here involved is that they are easily movable; for instance, the fence may be used to enclose a pasture area or an area freshly planted with vegetables or flowers. In such cases, the fence may have to be relocated when the pasture area is grazed off or fencing is no longer necesary when plants have reached a certain stage of growth. Easy removability requires that the ribbons can be rolled up or otherwise handled so that they can be easily detached from and reattached to the poles. The fastening means must also be so designed that they can be easily released and again attached.

Finally, it is essential that the costs of the ribbons are economically acceptable as often very substantial lengths of ribbons are involved, and that the fences are environmentally acceptable, especially if they are used to fence-in for instance a garden area.

There are known various types of electrified fences, but none of the known fences satisfies all the heretofore pointed out requirements, especially with respect to the electric conductors. Electric conductor wires may resist the effect of weather for a reasonable time and also impact by animals, but they are not conspicuous and they also tend to become entangled when detached for reuse.

Ribbons made of thin metal strips are known but it has been found that such tend to break, due to the impact of wind, especially close to the poles. To strengthen the ribbons they are coated on one side with a layer of plastics material, or even on both sides.

Tests and practical experience have shown that a thin plastic coating tends to be rapidly destroyed by the influence of the weather and also by the action of ultra-violet rays. Use of coatings on both sides of the metal strips limits the exposure of the metal and the likelihood of an electric shock upon contact with the ribbons. Thickening of the metal strips and the coatings may extend the useful life of the ribbons, but it makes it too heavy and stiff for convenient handling and also considerably increases the costs, both of the ribbon itself and the mounting or relocating thereof.

THE INVENTION

It is a broad object of the invention to provide a novel and improved ribbon for electrified fences which is highly resistant to weather conditions, highly pliable for easy installation and relocation and very conspicuous.

A more specific object of the invention is to provide a novel and improved ribbon which comprises several layers adhered to each other consisting of metal and plastic material so arranged and selected that the ribbon is capable of resisting the influence of weather conditions for a long time without reducing its deterring function by causing shocks upon contact.

Another more specific object of the invention is to provide a novel and improved multi-layer ribbon which includes an outer and an inner metal layer so arranged that there may be electric connection by sparks or directly whereby the ribbon is still electrically charged if the outer metal is interrupted at some points.

A further specific object of the invention is to provide a novel and improved multi-layer ribbon so arranged that the metal layers are reduced to a minimal thickness thereby making the ribbon more pliable and considerably reducing costs.

Another broad object of the invention is to provide novel and improved fastening and splicing means for easily and rapidly securing electrically chargeable ribbons to poles or other carriers used in an electrified fence and detaching the ribbons for reuse and splicing the ends of ribbons.

SUMMARY OF THE INVENTION

The afore-pointed out objects, features and advantages of the invention, and other objects, features and advantages which will be pointed out hereinafter, are obtained by providing a multi-layer ribbon comprising an outer first metal layer consisting for instance of aluminum; a second layer made of a synthetic plastics material adhered to one side of the metal layer; a second metal layer also made for instance of aluminum; a first layer made of a synthetic plastics material; a layer of adhesive interposed between the second metal layer and one side of the second layer of plastics material; a second layer of plastics material adhered on one side to the other side of the second metal layer, and a third layer made of synthetic plastics material adhered to the other side of the second layer of plastics material.

The outer metal layer has a shiny surface thus reflecting light, thereby making this layer and thus the ribbon highly visible. The layer of plastics material constitutes the outer layer opposite to the reflective outer metal layer is darkly colored, for instance it may be black or dark red. It has been found that such coloring reduces very considerably the effect of ultra-violet rays. Moreover, if there is snow or ice, the reflecting surface will become less noticeable but the dark surface will be in sharp contrast with the snow or ice.

According to a further aspect of the invention, one or several ribbons as described are fastened to poles or other carriers by fastening means which provide releasable mounting of the ribbons either to an intermediate portion of the poles or to the top thereof.

The invention also provides fastening means for mechanically and conductively clamping ends of ribbons as needed.

BRIEF DESCRIPTION OF THE DRAWINGS

In the accompanying drawing, several embodiments of the invention are shown by way of illustration and not by way of limitation.

In the drawing:

FIG. 3 is an enlarged diagrammatic view of a ribbon according to the invention;

FIG. 4 is a cross-section of FIG. 3;

FIG. 5 is a perspective view of fastening means used for securing a ribbon to a fence pole;

FIG. 6 shows the fastening means of FIG. 5 and the ribbon in an advanced stage of operation;

FIG. 12 is a view, partly in section, of a device for connecting a power supply wire to the ribbon, the device being shown in its open position;

FIG. 13 shows the device of FIG. 12 in its clamped position;

FIG. 14 is a section taken on line 14—14 of FIG. 13 on an enlarged scale; and

DETAILED DESCRIPTION OF THE DRAWINGS

Figure 1:
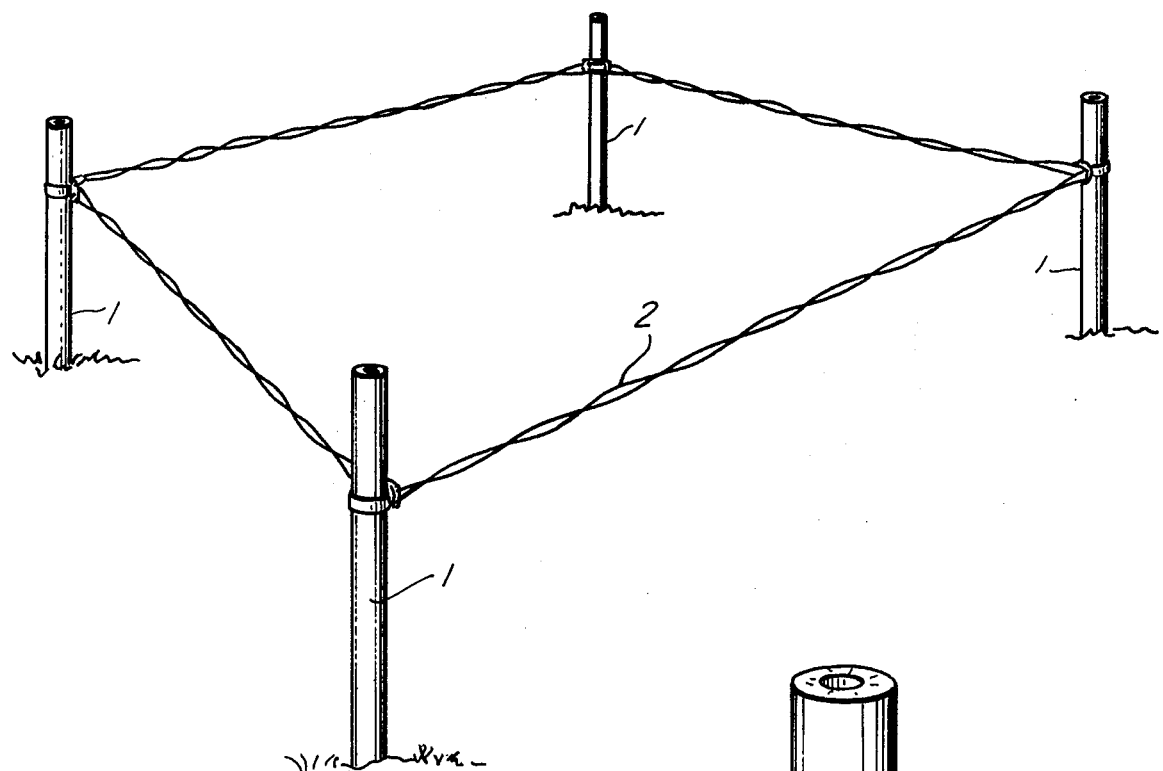
FIG. 1 is a perspective simplified view of an electrified fence according to the invention.

Referring now to the figures more in detail, and first to FIG. 1, this figure shows four poles 1 to which a twisted electrically conducting ribbon 2 is secured. A fence according to the invention is, of course, not limited to four poles; the number of poles depends upon the area to be fenced in. The poles may be wooden poles, but it has been found that tubular poles made of a synthetic plastic material such as glass fiber reinforced polyester or other suitable plastics is particularly advantageous, especially if the fence is to be relocated from time to time. Poles made of metal either solid or hollow, can, of course, also be used. Moreover, other types of carriers may be used, for instance, if the ribbons are to be stretched between two walls or other locations which permit mounting of suitable carriers.

Referring now to FIGS. 3 and 4, these figures show the ribbon as a multi-layer ribbon. The exemplified ribbon consists of an outer layer 5 made of a suitable metal such as aluminum. It is essential that the outwardly facing side of layer 5 is shiny and thus light-reflecting. A layer 6 of a suitable plastics material such as polyethylene or polyvinyl chloride is adhered to the inwardly facing side of layer 5. A second layer 7 of suitable synthetic plastics material is adhered to layer 6 by a suitable adhesive such as glue indicated at 8. A third layer 9 made of synthetic plastics material is adhered to the respective side of layer 7. Finally, the outside of layer 9 is coated with a layer 10. The layer 10 is coated with a darkly colored material such as black or dark red, but of course layer 10 itself may be of darkly colored plastics material. Black polyethylene has been found to be particularly useful. In some instances, some of the insulation layers such as layer 7 may be omitted and layer 10 itself may be made of colored material rather than being coated.

As it is now apparent, one outward facing side of the ribbon is light-reflecting while the opposite outwardly facing side is light-absorbing thereby to some extent nullifying or at least reducing the effect of ultraviolet rays which, as previously pointed out, tend to deteriorate or even seriously damage ribbons of the kind here involved.

Reverting to FIG. 1, if a ribbon as shown in FIGS. 3 and 4 is twisted, as shown in FIG. 1, the light-reflecting side 5 will make the ribbon very conspicuous to animals and also humans, while the dark side 10 will protect the ribbon, at least to some extent, against deterioration by ultra-violet rays. Moreover, the dark side of the ribbon becomes conspicuous when there is snow on the ground.

As previously pointed out, the cost factor is an important one for electrically conducting ribbon of the type here involved. Extensive tests have shown that the multi-layer arrangement as disclosed in the present invention permits use of metal layers which can be much thinner than was heretofore possible.

EXAMPLE 1

It has been found that a ribbon having a width of 10 mm and consisting of a combination of layers as previously described, may be composed of foils consisting of aluminum foil with a thickness of 15 $\mu$m; a layer of polyester having a thickness of 190 $\mu$m; a second layer of aluminum foil having a thickness of 15 $\mu$m; a further layer of polyester having a thickness of 190 $\mu$m, and a layer of black polyethylene having a thickness of 30 $\mu$m. The metal layer instead of consisting of foil may also consist of powderized metal applied for instance by sputtering or electrolytic deposition.

Heretofore, it was thought to be impossible to use metal layer thicknesses of less than 50 $\mu$m. Aside from costs, a very important further advantage of a multi-layer ribbon according to the invention is that due to the thinness of the metal layers, the electrical conduction through the ribbon is maintained even if the outer metal layer is damaged by weather conditions or by impact. The conductors of electrified fences of the kind here involved are charged with several thousand volts. As a result, there will be sparking between the two metal layers if the outer metal layer is damaged. Such sparking will cause some spot welding at the metal layers and thus maintain the flow of electricity.

EXAMPLE 2

A ribbon having a width of 12 mm was composed of glass fiber reinforced polyester having a thickness of 350 $\mu$m with a coating on one side of aluminum foil having a thickness of 20 $\mu$m. The side of the ribbon opposite to the metal foil consisted of red colored nylon having a thickness of 100 $\mu$m. The fastening means (described later on) were made of polyester reinforced with glass fiber having a thickness of 150 μm. The outside of the fastening means was coated with polyethylene colored blue and yellow. The thickness of the coating was 30 μm.

As it is apparent, ribbons colored in the above-indicated manner have an ornamental attraction in that there is light reflection and movement of the two colors if and when the ribbon is fluttering somewhat by the impact of wind. Hence, such colorful fence may be advantageously used as a fence in a garden area.

EXAMPLE 3

It has been found by tests that the effect of the wind impact can be reduced by providing an inner layer of aluminum foil having a thickness of 15 μm and by covering the aluminum layer on both sides by polyester layers having a thickness of 100 μm. On one side of these layers is provided an aluminum foil having a thickness of 15 μm. It has been found that a thickness of 9 μm may be sufficient. The opposite outwardly facing side may be colored, for instance by colored print.

As it is evident, while FIG. 1, shows only one ribbon any number of twisted or not twisted ribbons may be provided depending upon the specific requirements and the size of the fence.

Figure 2:
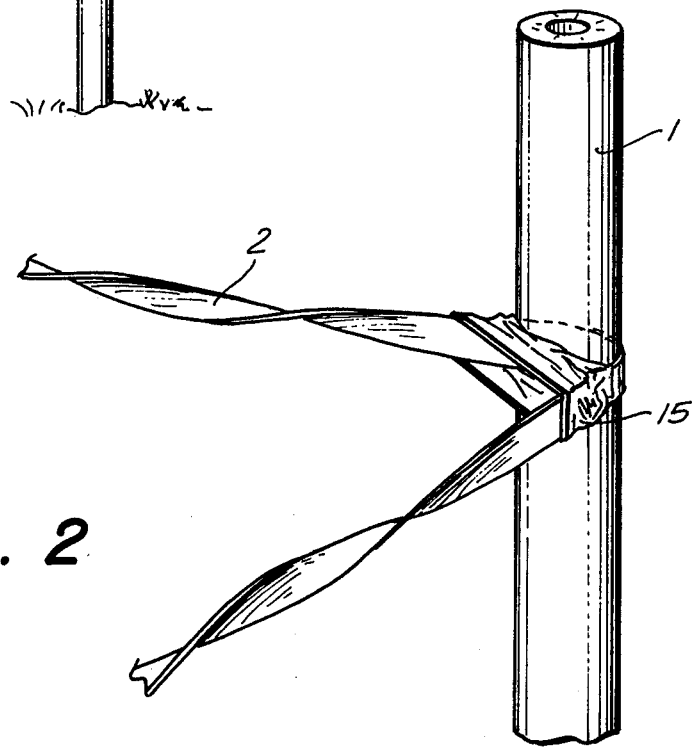
FIG. 2 is a fragmentary view of FIG. 1 showing the electrically conductive ribbon secured to one of the fence poles on an enlarged scale.

Turning now to FIG. 2 and in connection therewith to FIGS. 5 and 6, as it is shown in these figures the ribbon can be conveniently and releasably secured to a pole by bending the ribbon to form a loop as shown in FIG. 6. A ring 5 made of elastically stretchable material such as polyester is then slipped upon the looped ribbon portion, as it is shown in FIGS. 2 and 6. If now the ribbon is stretched tight on a pole, the loop will be tightened about the pole and the ring will become stretched as it is shown in FIG. 2, thus conveniently and safely securing the ribbon in position. As it has been described in connection with Example 2 the ring may be colored.

FIGS. 7 to 10 show mounting of a ribbon on the top of a pole. The mounting device as illustrated in these figures consists of a receiving clampling member 17 and an engaging clamping member 18. The receiving clamping member is suitably secured to the top of a pole 1, for instance by means of a sleeve 19 through which a nail 20 or a screw can be driven into the top of the pole.

Figure 7:
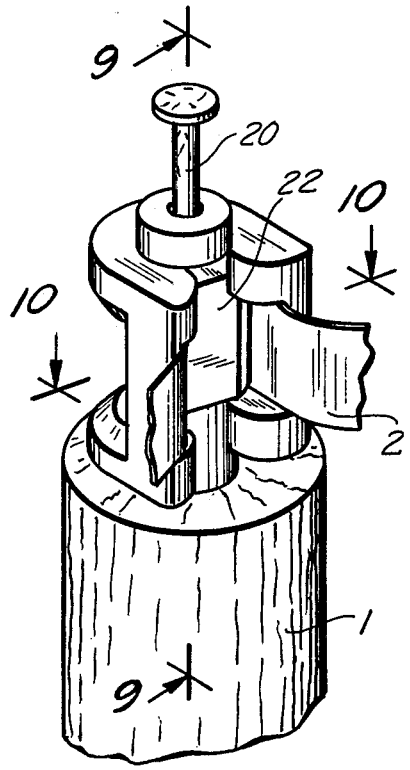
FIG. 7 is a perspective view of a modification of the fastening means.
Figure 8:
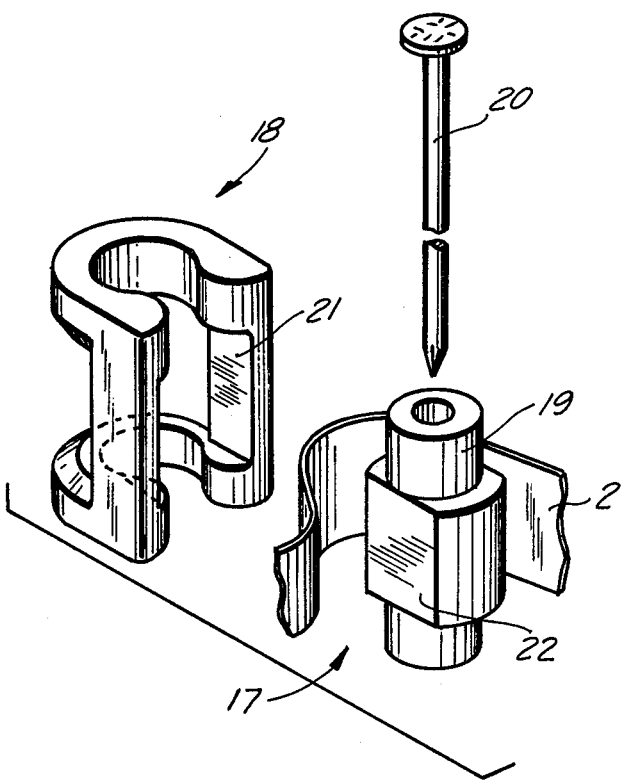
FIG. 8 is an exploded perspective view of the fastening means according to FIG. 7.
Figure 9:
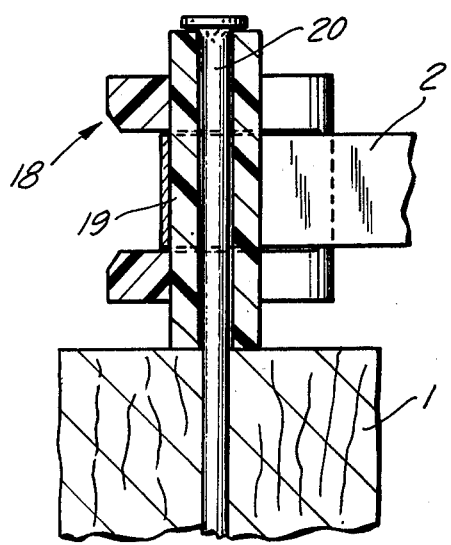
FIG. 9 is a section along line 9—9 of FIG. 7.
Figure 10:
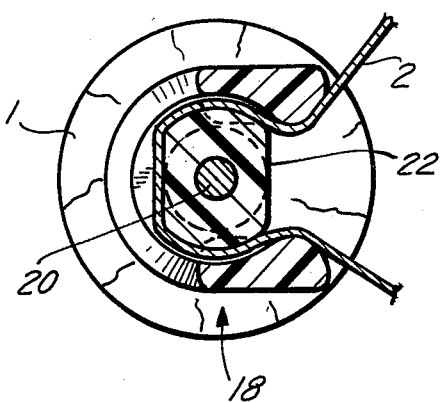
FIG. 10 is a section along line 10—10 of FIG. 7.

The engaging clamping member has a generally horseshoe-shaped cross-sectional configuration. It is preferably provided on its open side with flattened surfaces 21. Similarly, the receiving clamping member is provided with flattened surfaces 22. The engaging clamping member is made of an electrically yielding material such as a suitable plastics material and the spacing of surfaces 21 and 22 are so correlated that when the clamping member is pushed upon the receiving member as it is shown in FIGS. 7, 9 and 10, it will grip the receiving damping member with a pressure fit thereby locking ribbon 2 to the pole.

Figure 11:
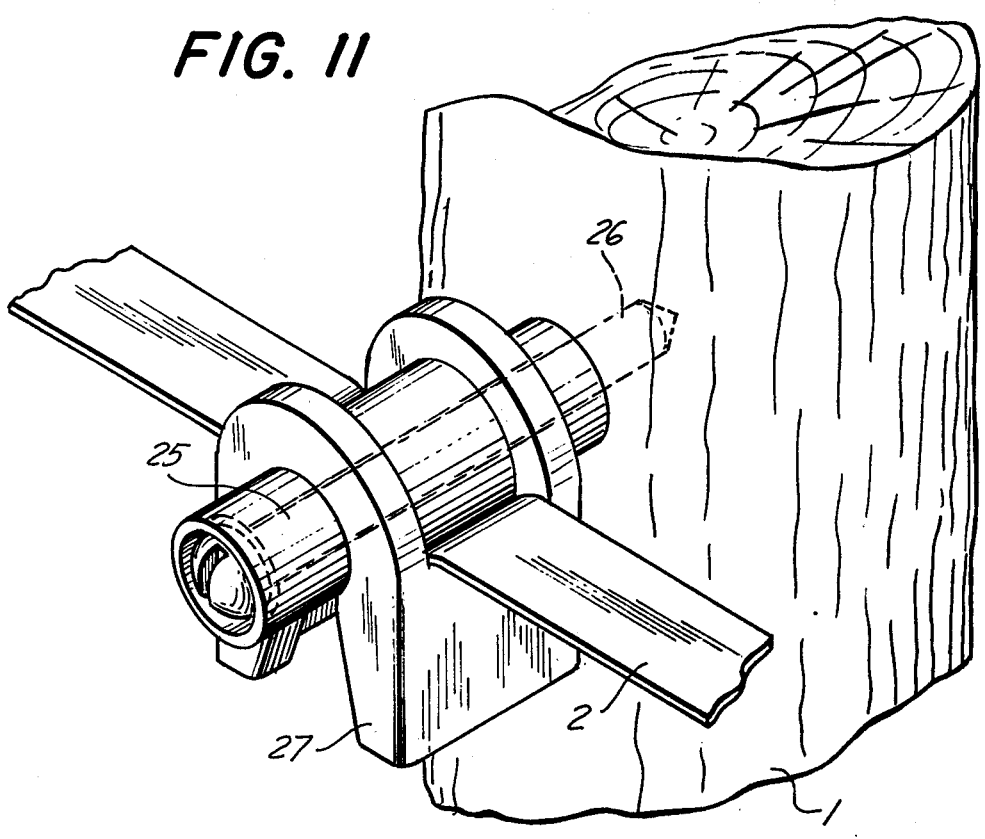
FIG. 11 is a perspective view of another modification of fastening means for securing the ribbon to a fence pole.

FIG. 11 shows a fastening device for securing the ribbon to any selected point along the length of a pole. There is shown a hollow or solid generally cylindrical member 25 which is secured to the pole, for instance by a screw or nail 26. This cylindrical member serves as a receiving clamping member upon which can be slipped an engaging clamping member 27. This member 27 is made of suitable elastically yielding material such as a plastics material, for instance polyester and is so shaped that it can be snapped upon the receiving clamping member 25. As it is evident from FIG. 11, when ribbon 2 is threaded upon the clamping member 25 and the clamping member 27 is then snapped upon clamping member 25, the ribbon will be held in position.

Referring now to FIGS. 12, 13 and 14, these figures show a device for connecting a power supply wire 41 (see FIG. 15) to ribbon 2. For this purpose there is provided a sleeve 30 made of insulation material on the inside of which a connecting member 31 is secured. This member is to be connected to the power supply wire and coacts with a second connecting member 32 which is displaceable within the sleeve and has a surface which is parallel with the facing surface of connecting member 31. Member 32 is provided with a slanted surface 33, which coacts with a guide pin 34. FIG. 12 shows the device in its open position, that is, in the position for slipping in ribbon 2 to be connected to wire 41. If now member 32 is displaced relative to member 31 as it is shown in FIG. 13, the member 32 is moved toward member 31, thereby clamping the ribbon against member 31. A knob 35 may be provided on member 32 to pressure the ribbon further against connecting member 32.

Figure 15:
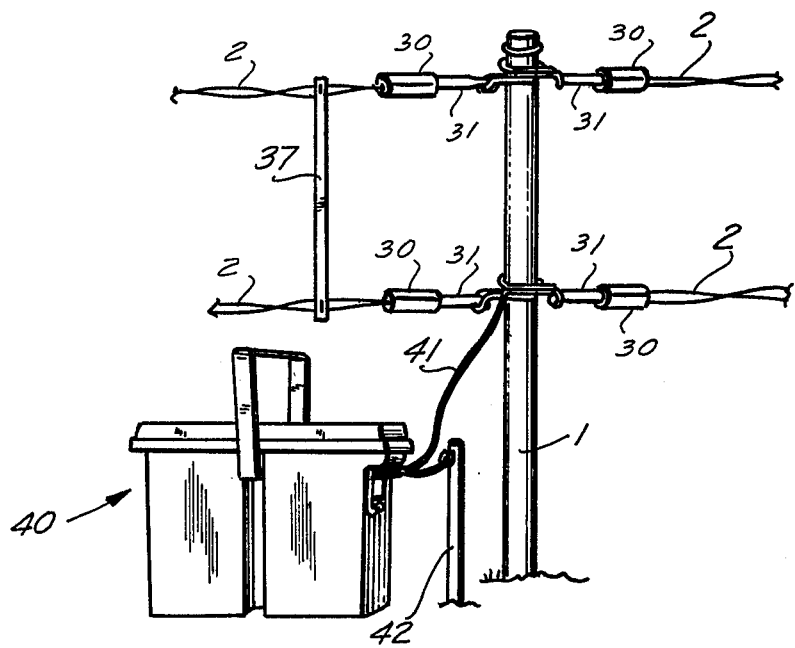
FIG. 15 is a fragmentary view of an electrified fence according to the invention and power equipment for electrically charging the ribbons of the fence.

Referring to FIG. 15, this figure shows two ribbons 2 secured to a pole 1 by any of the fastening means previously described. There are further shown connecting means of the type shown in FIGS. 12, 13 and 14. The two ribbons may be separated by spacers 36. Such spacers may also be used for electrically connecting the two ribbons. There is diagrammatically shown a power supply 40. One wire 41 of the power supply device is connected to a ribbon or ribbons by the connecting device and the second wire 42 is grounded.

The power supply may be battery-operated and include circuit components suitable for generating a charge of several thousand volts. Suitable power supplies of this kind are well known and readily available in the market. Of course, it is also possible to connect the fence ribbons directly to a main power line provided, of course, that the power delivered by such main line is transformed so that while deterrent shocks are generated there is no danger to humans or animals coming in contact with the fence ribbons.

While the invention has been described in detail with respect to certain now preferred examples and embodiments of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:

1. An electrified fence comprising: a plurality of carriers; at least one multi-layered ribbon; and fastening means for releasably fastening said ribbon to each of said carriers wherein said fastening means comprise an open loop of ribbon encompassing one of the carriers, and a ring made of elastically stretchable material slippable upon the two loop ends of the ribbon whereby upon tensioning said loop ends the resulting stretching of the ring anchors the loop in the ribbon to the respective carrier.

2. The fence according to claim 1 wherein said carriers are tubular poles.

3. The fence according to claim 1 wherein said carriers are poles, and wherein said fastening means comprise an engaging clamping member, a receiving clamping member and mounting means for securing the receiving clamping member to the top end of any one of said poles, whereby upon bending a selected portion of the ribbon about the receiving member and attaching the engaging clamping member to the receiving clamping member the respective ribbon portion is clampled to the respective pole.

4. The fence according to claim 3 wherein said engaging clamping member has a substantially horseshoe-shaped cross-sectional configuration and is made of elastically yielding material, and said receiving clamping member has a cross-sectional configuration fittable into the engaging clamping member with a pressure fit.

5. The fence according to claim 1 and further comprising connecting means for releasably connecting said ribbon to a power supply wire, said connecting means including a support member, a first connecting member fixedly secured to said support member and a second connecting member supported by the support member and slidable relative to the first connecting member, said second connecting member having a surface parallel to a facing surface of the first connecting member and a second surface slanted relative to said parallel surface, and a guide member secured to the support member for guiding the second connecting member along its slanted surface, displacement of the second connecting member relative to the first connecting member varying the spacing of the parallel surfaces of the connecting members whereby upon insertion of a ribbon between said two parallel surfaces and sliding the second connecting member toward the first connecting member said ribbon is held in mechanical and electrically conducting engagement with the first connecting member.

* * * * *